J. B. GRAHL.
TROUGH.
APPLICATION FILED SEPT. 14, 1916.
1,248,646.
Patented Dec. 4, 1917.
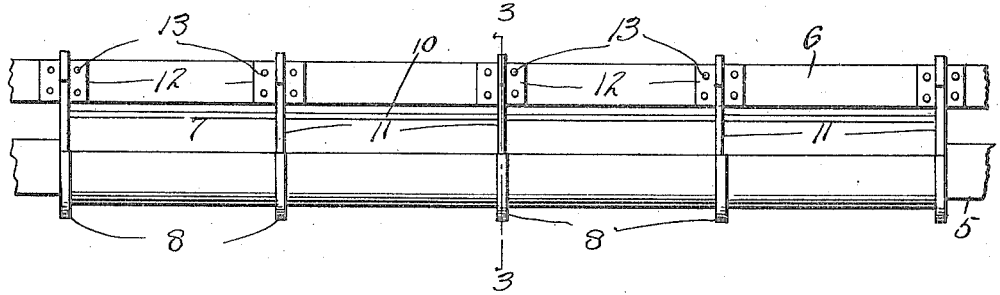
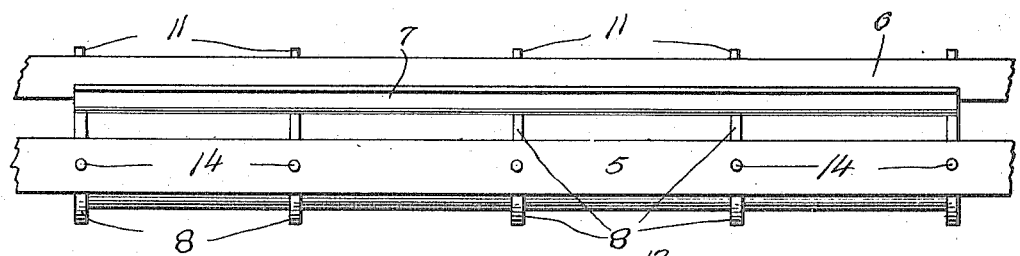
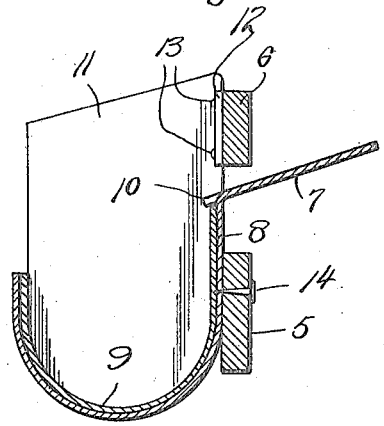
INVENTOR
Joseph B. Grahl.
WITNESSES
BY
ATTORNEY

UNITED STATES PATENT OFFICE.

JOSEPH B. GRAHL, OF CANTON, NORTH CAROLINA.

TROUGH.

1,248,646. Specification of Letters Patent. Patented Dec. 4, 1917.

Application filed September 14, 1916. Serial No. 120,125.

*To all whom it may concern:*

Be it known that I, JOSEPH B. GRAHL, a citizen of the United States, residing at Canton, in the county of Haywood and State of North Carolina, have invented certain new and useful Improvements in Troughs, of which the following is a specification.

This invention relates to hog troughs, and has among other objects to provide a simple, inexpensive and sanitary feeding place for hogs, a trough which while being readily accessible to the animals from the inside of the pen, may be easily supplied with food from the exterior of the pen, which provides separate compartments for the various animals to feed from, and which will prove thoroughly practical and efficient in use.

With these objects in view, together with others which will appear as the description proceeds, the invention resides in the novel formation, combination, and arrangement of parts, all as will be described more fully hereinafter, illustrated in the drawings, and particularly pointed out in the claims.

In the drawings forming a part of this specification:

Figure 1 is a front elevation of the trough;

Fig. 2 is a rear elevation of the device; and

Fig. 3 is a transverse sectional view taken on line 3—3 of Fig. 1 and on a slightly enlarged scale.

Referring now more particularly to the drawings, 5 and 6 indicate the first and second longitudinal rails of a conventional form of hog pen. The invention is adapted particularly for use in connection with a pen having longitudinally arranged spaced rails; however, the device may be easily rendered applicable to pens of different constructions with the use of a pair of relatively long rails or boards.

In carrying out the invention, I provide a plate 7, formed of metal such as galvanized iron or other non-corrosive material, of a length equal to that of the trough to be used, and of relatively narrow width. This plate is provided at one edge with a plurality of depending spaced hook shaped fingers 8, which are adapted to pass beneath and to support a trough indicated at 9. The trough is preferably formed of material similar to that of which the plate is constructed, and is of a size suitable for the purposes for which it is to be used, and snugly rests within the hook-shaped portions of the fingers 8. The rear wall of the trough preferably extends higher than the front wall and terminates in substantially the same plane with the adjacent edge of the plate 7. The inner edge of the plate 7 may be so formed as to provide an inwardly extending flange or shoulder 10, to engage over the upper edge of the rear wall of the trough and to limit the upward movement of the trough. The forward edge of the trough preferably terminates in alinement with the extremities of the fingers 8.

Partitions 11 are arranged in spaced relation within the trough and fit down into the same. These partitions are also constructed preferably of galvanized iron, and extend above the edges of the trough an appreciable distance. These partitions are provided with laterally extending flanges 12, at their upper rear edges, through which retaining screws or nails 13 may be driven to secure the said partitions to the uppermost of the pen rails 6.

Screws or nails 14 may be employed to secure the fingers 8 to the lowermost of the pen rails.

The device is arranged upon a pen with the plate 7 projecting to the exterior thereof and spaced slightly below the lowermost edge of the upper pen rail 6. The fingers 8 extend from the inner longitudinal edge of the plate downwardly into close proximity to the ground, and the trough 9 supported thereby will be positioned so as to afford ready access to the animals to feed from the same. Food for the animals is deposited upon the plate 7, and, due to the slight downward inclination of the said plate, the said food will slide to the interior of the pen and into the trough 9. Animals may feed freely at the trough, and the partitions 11 prevent crowding.

From the foregoing, it is obvious that there has been provided an extremely simple trough for feeding animals, and yet one which will prove thoroughly practical and efficient in use. The trough and its component parts may be readily attached to, and detached from the pen rails, and it is apparent that the device may be readily cleansed.

While the above is a description of the preferred embodiment of the invention, it is apparent that various changes in the minor details of construction and arrangement of parts, may be made, if desired, without departing from the scope of the invention or exceeding the spirit of the claims.

What is claimed is:

1. The combination with a pen having spaced longitudinally disposed rails, of a plate, fingers depending from said plate and secured to the lowermost of said rails, the said plate being spaced below the upper rail, a trough resting within said fingers and being capable of sliding laterally thereof, and partitions arranged in spaced relation in said trough, substantially as described.

2. In a device of the class described, a plate, a plurality of fingers depending from said plate and being curved at their ends into substantially U-shape, a trough resting in the said U-shaped fingers, and being capable of sliding thereon, partitions secured adjacent said plate and above said fingers, and the lower edges of said partitions being spaced above the said fingers a distance equal to the thickness of said trough and being concentric with the curved portions of said fingers, substantially as described.

In testimony whereof I affix my signature in presence of two witnesses.

JOSEPH B. GRAHL.

Witnesses:
J. N. MEASE,
J. H. KIRKPATRICK.

Copies of this patent may be obtained for five cents each, by addressing the "Commissioner of Patents, Washington, D. C."